US008868048B2

(12) United States Patent
Hanson et al.

(10) Patent No.: US 8,868,048 B2
(45) Date of Patent: Oct. 21, 2014

(54) APPARATUS AND METHOD FOR MANAGING ELECTRONIC TRANSACTIONS

(71) Applicant: Bank of America Corporation, Charlotte, NC (US)

(72) Inventors: Carrie A. Hanson, Charlotte, NC (US); Laura C. Bondesen, Charlotte, NC (US); Nicole Chen, San Francisco, CA (US); Katherine Dintenfass, Charlotte, NC (US); Scott R. Enscoe, Waxhaw, NC (US); Leo Kopelow, San Francisco, CA (US); Yameng Li, Berkeley, CA (US); Brett Newman, Burlingame, CA (US); Nicholas Sharp, San Francisco, CA (US); Marc L. Warshawsky, Davidson, NC (US); Alexander C. Wittkowski, Charlotte, NC (US); Jon R. Wolf, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 13/652,611

(22) Filed: Oct. 16, 2012

(65) Prior Publication Data
US 2014/0106717 A1 Apr. 17, 2014

(51) Int. Cl.
*H04M 3/42* (2006.01)
(52) U.S. Cl.
USPC ........ 455/414.1; 455/418; 455/419; 455/420; 455/466; 455/550.1; 455/562.1; 709/224; 705/35; 705/37; 705/38; 705/39; 705/40; 705/41; 705/42; 705/43; 705/44

(58) Field of Classification Search
CPC ............... H04L 29/08108; H04L 29/08072; H04W 8/245; H04W 4/14; H04M 1/72519; G06Q 40/00; G06Q 50/04; G06Q 40/025; G06F 3/04815
USPC ........ 455/414.1, 418–420, 466, 550.1, 562.1; 709/224; 705/35–44; 715/848
See application file for complete search history.

(56) References Cited

U.S. PATENT DOCUMENTS 5,058,185 A * 10/1991 Morris et al. ................. 382/305
5,339,392 A 8/1994 Risberg et al.
(Continued)

OTHER PUBLICATIONS

My App World, *Trading Stocks on Your IPad with Etrade Mobile*, Jul. 6, 2010, http://myappworld.com/trading-stock-ipad-etrade-mobile/headline/.

(Continued)

*Primary Examiner* — Steve D Agosta
(74) *Attorney, Agent, or Firm* — Michael A. Springs

(57) ABSTRACT

In some embodiments, an apparatus includes a memory and a processor. The processor is operable to present, in a first region of a display, information associated with a first transaction of a plurality of transactions and present, in a second region of the display, a first option, the first option indicating that, when selected, the user has marked the first transaction for further review. The processor is further operable to present, in a third region of the display, a second option and present, in a fourth region of the display, a notification indicating a second transaction of the plurality of transactions. Additionally, the processor is operable to detect a touch on the display indicating the selection of the second transaction and present, in the first region of the display, information associated with the second.

21 Claims, 5 Drawing Sheets

(56) References Cited

U.S. PATENT DOCUMENTS

| | | | | |
|---|---|---|---|---|
| 5,471,575 | A | * | 11/1995 | Giansante .................... 715/202 |
| 5,491,783 | A | * | 2/1996 | Douglas et al. ............... 715/846 |
| 5,579,472 | A | * | 11/1996 | Keyworth et al. ............ 715/751 |
| 7,827,099 | B1 | | 11/2010 | Cotton |
| 8,016,192 | B2 | | 9/2011 | Messerges et al. |
| 8,032,453 | B2 | | 10/2011 | Ahuja et al. |
| 8,260,699 | B2 | | 9/2012 | Smith et al. |
| 8,527,413 | B2 | | 9/2013 | Heller |
| 8,651,373 | B1 | | 2/2014 | Block et al. |
| 8,660,943 | B1 | | 2/2014 | Chirehdast |
| 8,682,753 | B2 | | 3/2014 | Kulathungam |
| 2002/0055899 | A1 | | 5/2002 | Williams |
| 2002/0099777 | A1 | | 7/2002 | Gupta et al. |
| 2004/0088254 | A1 | | 5/2004 | Zielke et al. |
| 2007/0174448 | A1 | | 7/2007 | Ahuja et al. |
| 2008/0148182 | A1 | | 6/2008 | Chiang et al. |
| 2009/0144655 | A1 | | 6/2009 | Hardy et al. |
| 2010/0058196 | A1 | | 3/2010 | Krishnan et al. |
| 2010/0106611 | A1 | | 4/2010 | Paulsen et al. |
| 2010/0325047 | A1 | | 12/2010 | Carlson et al. |
| 2011/0066505 | A1 | | 3/2011 | Hammad |
| 2011/0145120 | A1 | | 6/2011 | Lee et al. |
| 2011/0194676 | A1 | | 8/2011 | Hogan et al. |
| 2011/0202467 | A1 | | 8/2011 | Hilber et al. |
| 2011/0246950 | A1 | | 10/2011 | Luna et al. |

OTHER PUBLICATIONS

Techreviews, *E\*Trade Mobile Pro iPad app* Review, Apr. 6, 2010, http://tabletapps.net/etrade-mobile-pro-ipad-app-review/.

Business Wire, *E\*Trade Launches CNBC Plus Live Streaming Video On Its Redesigned Active Trader Platform*, Jan. 7, 2010, https://about.etrade.com/releasedetail.cfm?ReleaseID=434823.

Business Wire, *E\*Trade Launches Mobile Pro Application for iPad™*, Apr. 6, 2010, https://aboutetrade.com/releasedetail.cfm?ReleaseID=456918.

Mobile Magazine, Pilato, Fabrizio, *E-Trade app lets you trade like a pro on your iPad*, Apr. 7, 2010, http://www.mobilemag.com/2010/04/07/e-trade-app-lets-you-trade-like-a-pro-on-your-ipad/.

Carrie A. Hanson, et al., U.S. Appl. No. 13/652,689, filed Oct. 16, 2012, *Apparatus and Method, for Presenting Electronic Notices*.

Carrie A. Hanson, et al., U.S. Appl. 13/652,565, filed Oct. 16, 2012, *Apparatus and Method for Management of Electronic Notices*.

Carrie A. Hanson, et al., U.S. Appl. 13/652,689, filed Oct. 16, 2012, Non-final Office Action, Jun. 27, 2013.

Carrie A. Hanson, et al., U.S. Appl. No. 13/652,689, *Response Pursuant to § 1.111*, Sep. 25, 2013.

Carrie A. Hanson, et al., U.S. Appl. No. 13/652,689, filed Oct. 16, 2012, final Office Action, Nov. 7, 2013.

Carrie A. Hanson, et al., U.S. Appl. No. 13/652,689, *Request for Continued Examination and Amendment Response*, Feb. 6, 2014.

Carrie A. Hanson, et al., U.S. Appl. No. 13/652,689, filed Oct. 16, 2012, Non-final Office Action, Feb. 24, 2014.

Carrie A. Hanson, et al., U.S. Appl. No. 13/652,689, filed Oct. 16, 2012, Response after Non-final Office Action, May 27, 2014.

Carrie A. Hanson, et al., U.S. Appl. No. 13/652,689, filed Oct. 16, 2012, Final Office Action, Jun. 16, 2014.

Carrie A. Hanson, et al., U.S. Appl. No. 13/652,565, filed Oct. 16, 2012, USPTO Non-final Office Action, Jun. 25, 2014.

\* cited by examiner

APPARATUS AND METHOD FOR MANAGING ELECTRONIC TRANSACTIONS

TECHNICAL FIELD OF THE INVENTION

This disclosure relates generally to an apparatus for the management of electronic notices.

BACKGROUND OF THE INVENTION

As the use of mobile devices grows, so has the desire for customers to have real-time access to up-to-date financial information on their mobile device. Financial institutions may offer a variety of services to a customer and may desire to present information about the services to its customers.

SUMMARY OF THE INVENTION

According to embodiments of the present disclosure, disadvantages and problems associated with previous systems may be reduced or eliminated.

In certain embodiments, an apparatus includes a memory operable to store user preferences associated with a user and a processor communicatively coupled to the memory. The processor is operable to present, in a first region of a display, information associated with a first service based at least in part upon the user preferences and present, in a second region of the display, information associated with a second service based at least in part upon the user preferences. The processor is further operable to present, in a third region of the display, information associated with a third service based at least in part upon the user preferences and present, in a fourth region of the display, information associated with a fourth service based at least in part upon the user preferences. Additionally, the processor may receive an update to the information associated with the first service and present, in the first region of the display, the update to the information associated with the first service. Finally, the processor is operable to detect a first touch on the first region of the display indicating a selection of the first service and present, in at least the first, second, third, and fourth regions of the display, details associated with the first service in response to detecting the first touch.

In some embodiments, an apparatus includes a memory operable to store information associated with a plurality of transactions associated with a user and a processor communicatively coupled to the memory. The processor is operable to present, in a first region of a display, information associated with a first transaction of the plurality of transactions and present, in a second region of the display, a first option, the first option indicating that, when selected, the user has marked the first transaction for further review. The processor is further operable to present, in a third region of the display, a second option, the second option indicating that, when selected, the user has reviewed the first transaction and present, in a fourth region of the display, a notification, the notification indicating a second transaction of the plurality of transactions, wherein the second transaction occurred subsequent to the first transaction. Additionally, the processor is operable to detect a first touch on the display indicating the selection of the second transaction and present, in the first region of the display, information associated with the second transaction in response to detecting the first touch.

According to some embodiments an apparatus includes a memory operable to store information associated with a first plurality of events and store information associated with a second plurality of events. The apparatus also includes a processor communicatively coupled to the memory and operable to detect a first authentication of a user, detect the first plurality of events, wherein the first plurality of events occurred subsequent to the first authentication of the user, and detect a second authentication of the user. The processor is also operable to present, in a first region of a display, information associated with a first at least one of the first plurality of events in response to the second authentication of the user and present, in a second region of the display, the information associated with the second plurality of events. The processor can detect a first touch on the first region of the display indicating a request to present a second at least one of the first plurality of events and scroll the first region of the display at least in response to the first touch. The processor is further operable to determine that each one of the first plurality of events has been presented and scroll the first region of the display in conjunction with the second region of the display at least in response to determining that each one of the first plurality of events has been presented.

Particular embodiments of the present disclosure may provide one or more technical advantages. For example, in some embodiments, the system of the present disclosure may reduce the load on network by consolidating notices and transactions and related management functions. Furthermore, the system of the present disclosure, by executing an application on a mobile device, may reduce the amount of processing power needed to perform various functions related to the management and retrieval of electronic notices.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE INVENTION

Figure 1:
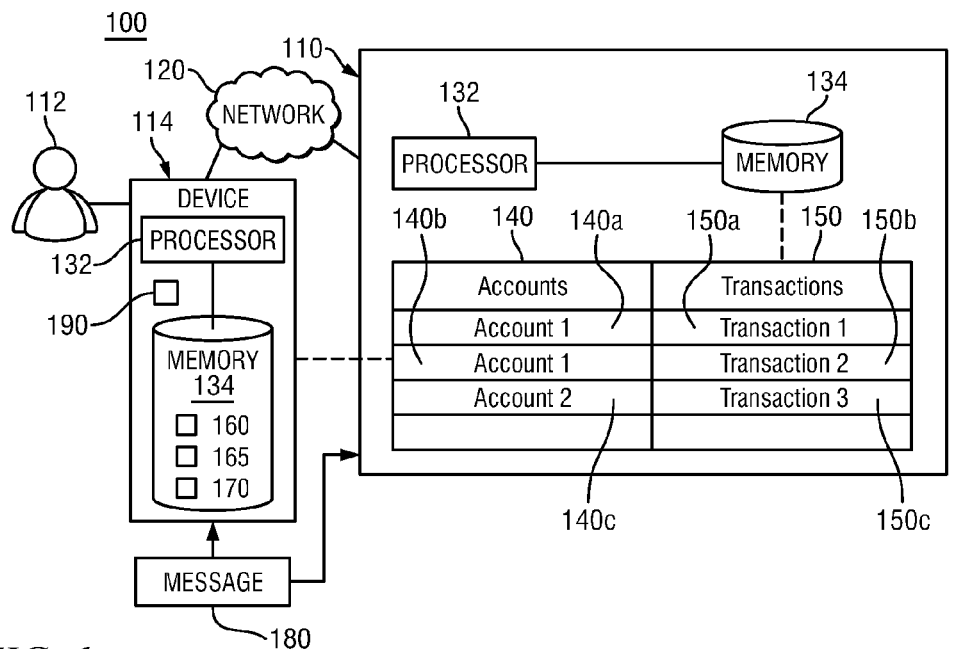
FIG. 1 illustrates a system for providing financial information to a customer.

FIG. 1 illustrates a system 100 for providing financial information to a customer. In certain embodiments, system 100 may facilitate performance of various functions related managing and presenting financial information related to various services. As particular examples, system 100 may facilitate (1) the management of electronic notices, (2) the management of electronic transactions, and/or (3) the presentation of electronic notices and transactions. As provided by FIG. 1, system 100 includes a device 114, network 120, and server 110. Device 114 may be communicatively coupled to server 110 through network 120.

Generally, a user 112 may use device 114 to receive and manage information associated with accounts 140, transactions 150, financial services 160 and/or events 170. Device 114 provides an interface through which user 112 can receive various information associated with accounts 140, transactions 150, financial services 160 and/or events 170. Through the interface, the user may set user preferences 165 for receiving various information. Using the interface, the user may also act upon information displayed on device 114. The user 112 can act upon the information by touching or swiping a touchscreen of device 114.

Financial services 160 may be any service offered by a particular financial institution. For example, financial services 160 may be related to credit cards, debit cards, balance transfers, bill management, receipt management, savings accounts, checking accounts, investment accounts, financial budgeting, and/or any other financial service suitable for a particular purpose. Device 114 is capable of displaying information associated with any particular financial service 160. User 112 can then use device 114 to act upon the information associated with a particular financial service 160 by using the interface of device 114.

Events 170 may be any occurrence associated with the financial institution and/or user 112 that user 112 may desire to be notified. For example, events 170 may be the execution of a particular transaction 150 or communication from the financial institution. Examples of transactions 150 may be a purchase, a credit, a debit, a balance transfer, a payment due, a rejected payment, a financial fee, and/or any other financial transaction suitable for a particular purpose. Device 114 is capable of displaying information associated with any particular event 170. User 112 can then use device 114 to act upon the information associated with a particular event 170 by using the interface of device 114.

In particular embodiments, server 110 may be configured to store accounts 140 and corresponding transactions 150. Server 110 may include a processor 132 and a memory 134. The functions of server 110 described herein may be performed by processor 132 and/or memory 134.

Memory 134 may be configured to store accounts 140, corresponding transactions 150, financial service 160, events 170, and user preferences 165. Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices.

Processor 132 may be configured to handle messages 180 associated with accounts 140, transactions 150, financial services 160, and/or events 170. In particular embodiments, processor 132 may be configured to send and receive messages 180 to and from device 114. Messages 180 may request and/or send information about accounts 140, transactions 150, financial services 160, and/or events 170. For example, message 180 may be communicated by server 110 to device 114 and may include information about a new transaction 150 for a particular account 140 associated with user 112. As another example, message 180 may be communicated by device 114 to server 110 and may include information pertaining to actions taken by user 112 with regard to a particular account 140, transaction 150, financial service 160, and/or event 170.

Processor 132 may control the operation and administration of server 110 by processing information received from network 120 and memory 134. Processor 132 may include any hardware and/or software that operate to control and process information. Processor 132 may be a programmable logic device, a microcontroller, a microprocessor, any suitable processing device, or any suitable combination of the preceding.

System 100 may include network 120. Device 114 may communicate with server 110 through network 120. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 may include device 114. Device 114 may be communicatively coupled to server 110 through network 120. In particular embodiments, device 114 may present a variety of information to user 112 regarding accounts 140, transactions 150, financial services 160, and/or events 170. Device 114 may also provide user 112 an interface through which user 112 may interact with information regarding accounts 140, transactions 150, financial services 160, and/or events 170. For example, device 114 may receive message 180 from server 110 providing information about transaction 150 which device 114 may then present, via a display, to user 112. As another example, user 112 may be presented with information regarding transaction 150 and may use an interface of device 114 to act upon the information regarding transaction 150. Device 114 may communicate the action of user 112 to server 110 via message 180.

In particular embodiments, device 114 may include a processor and memory akin to the processor 132 and memory 134 of server 110. The memory of device 114 may be configured to store accounts 140, corresponding transactions 150, financial service 160, events 170, and user preferences 165 of user 112. The processor of device 114 may be configured to control a display of device 114. In particular embodiments, the processor of device 114 may present on the display an interface through which user 112 can efficiently manage user preferences 165 for displaying and interacting with information displayed by device 114. Using the interface of device 114, user 112 may also act upon the information displayed by device 114. The processor of device 114 may further generate and communicate messages 180 with server 110. The items stored in the memories of device 114 and server 110 may be stored solely in device 114, solely in server 110, or any combination thereof.

In particular embodiments, device 114 may be a mobile device 114. Device 114 may be associated with user 112. For example, user 112 may be the owner of device 114. Device 114 may execute an application 190. The application 190 may provide user 112 an interface through which user 112 can efficiently manage user preferences 165 for displaying and interacting with information displayed by device 114. Application 190 may include logic to handle actions performed by user 112, using the interface of device 114, upon the information displayed by device 114. Application 190, when executed, may cause device 114 to perform the functions described herein. Device 114 may include a processor 132 and memory 134. Memory 134 may store the instructions or software for the application 190 and processor 132 may execute the instructions.

Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112.

Figure 2:
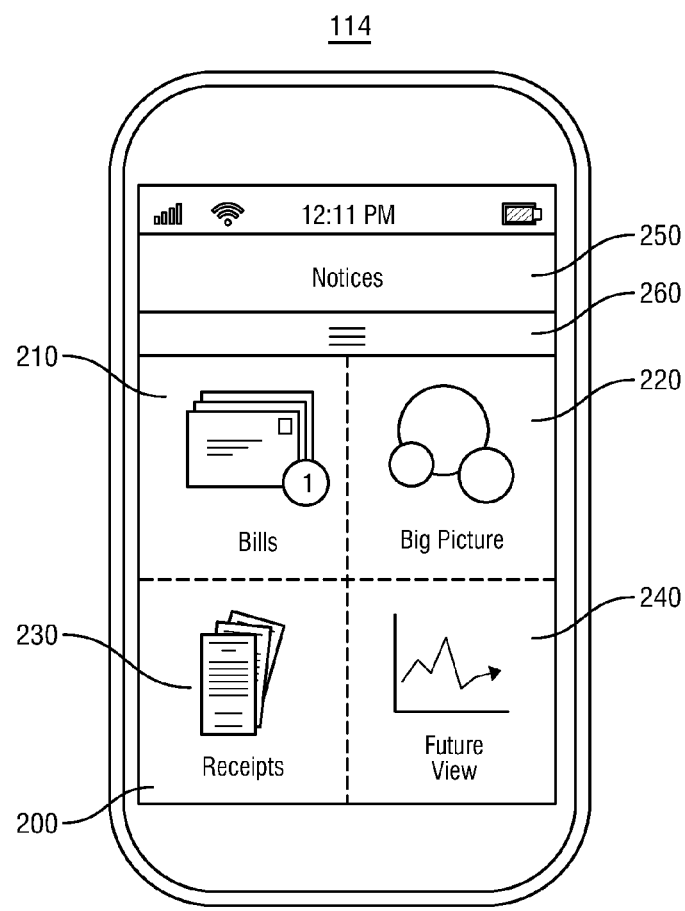
FIG. 2 illustrates an example embodiment of a mobile device used in FIG. 1.

FIG. 2 illustrates an example embodiment of device 114 used in FIG. 1. As provided by FIG. 2, device 114 may be mobile device 114 that includes display 200. Display 200 may include a touchscreen. User 112 may indicate selections by touching particular regions of display 200. For example, display 200 may present a button and user 112 may indicate a selection or push of the button by touching the region of the display 200 that presents the button. In particular embodiments, display 200 may present items in first region 210, second region 220, third region 230, fourth region 240, and/or fifth region 250. Items displayed in the regions may present information regarding particular accounts 140, transactions 150, financial services 160, and/or events 170. In the illustrated example, first region 210 provides information related to the financial service 160 of bill management. Second region 220 provides information related to the financial service 160 of overall wealth management. Third region 230 provides information related to the financial service 160 of receipt management (e.g., receipts associated with transactions 150). Fourth region 240 provides information related to the financial service 160 of investment management. Fifth region 250 may provide details to user 112 regarding the current functionality being provided by device 114.

This disclosure contemplates any region displaying information related to any suitable financial service 160. The regions of display 200 may also display updates to information in the regions in real-time. For example, if there is an update to the information in region 210, then user 112 may be notified of the update via an audio and/or visual cue from device 114. User 112 may touch these regions of display 200 to indicate different selections. Touching a particular region may expand to provide further information related to the particular financial service 160. In certain embodiments, after selection of a particular region, information related to the particular financial service 160 may occupy the portion of display 200 displaying first region 210, second region 220, third region 230, and/or fourth region 240. Display 200 may also include expansion bar 260. When user 112 selects expansion bar 260 (e.g., using a downward swiping motion), display 200 may display a consolidated list of all information related to the financial services 160 presented in the first, second, third, and fourth regions. This disclosure contemplates any suitable number and arrangement of regions in which different components may be implemented.

Figure 3:
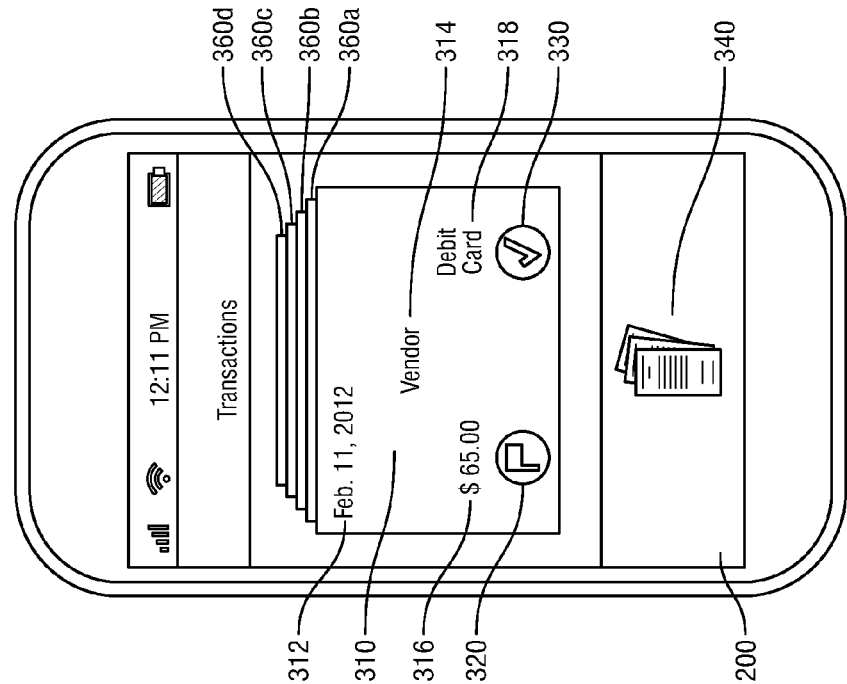
FIG. 3 illustrates an example embodiment of a mobile device used in FIG. 1.

FIG. 3 illustrates an example embodiment of device 114 used in FIG. 1. As provided by FIG. 3, device 114 may be mobile device 114 that includes display 200. Display 200 may include a touchscreen. In particular embodiments, display 200 may present items in first region 310, second region 330, third region 330, and/or fourth regions 360. First region 310 may present information regarding accounts 140, transactions 150, financial services 160, and/or events 170. For example, first region 310 may include timestamp 312, source 314, amount 316, and type 318. Timestamp 312 may be in any date/time format that represents a specific time a particular transaction 150 or event 170 may have occurred. Source 314 may be any source for a particular transaction 150 or event 170 (e.g., a vendor, a retailer, a financial institution). Amount 316 may provide details related to the amount of money that may be associated with a particular transaction 150 or event 170. Type 318 may be a type of a particular transaction 150 or event 170 (e.g., transactions 150 or events 170 related to credit cards, debit cards, balance transfers, bill management, receipt management, savings accounts, checking accounts, investment accounts, financial budgeting). Display 200 may also have second region 320 that presents user 112 with the option to mark a particular transaction 150 or event 170 for further review. In certain embodiments, second region 320 may be pre-selected indicating that user 112 should review the particular transaction 150 or event 170. Display 200 may have third region 330, which when selected, may indicate that user 112 has reviewed the particular transaction 150 or event 170.

Display 200 may have fourth regions 360, which may represent one or more other transactions 150 or events 170, if any. Fourth regions 360 may indicate to user 112 that there are other transactions 150 or events 170 for user 112 to review. In certain embodiments, transactions 150 or events 170 in fourth regions 360 may have occurred subsequent to the particular transaction 150 or event 170 presented in first region 310. Display 200 may also include fifth region 340 which may allow user 112 to drag certain items to in order to indicate that a next item should be displayed. For example, user 112 may swipe from approximately first region 310 to fifth region 340 indicating that the item in first region 310 has been reviewed. Display 200 may then display information related to the next transaction 150 or event 170 (e.g., represented by fourth region 360a).

User 112 may touch these regions of display 200 to indicate different selections. Certain selections may provide visual or audio feedback to user 112 indicating the selection, such as playing a sound and/or changing the state of a graphical icon. In certain embodiments, a selection may initiate communication with server 110. For example, user 112 may select second region 320. In response, device 114 may generate message 180 to server 110 indicating that user 112 has selected a particular transaction 150 or event 170 for further review. In some embodiments, message 180 may notify a financial institution that the selection of second region 320 indicates that user 112 is disputing the accuracy of a certain transaction 150 or event 170. This disclosure contemplates any suitable number and arrangement of regions in which different components may be implemented.

Figure 4:
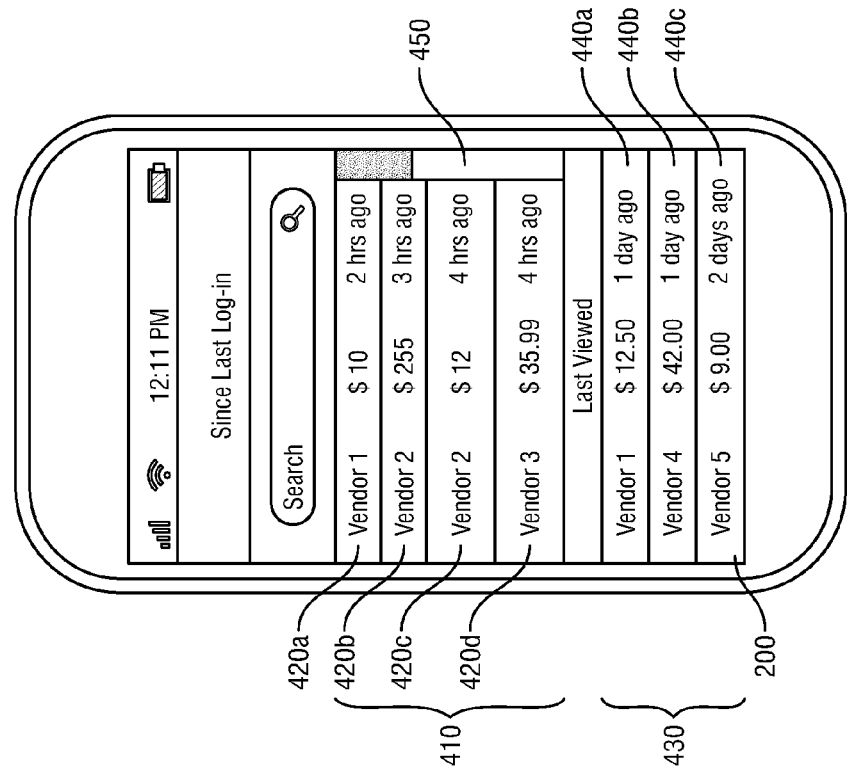
FIG. 4 illustrates an example embodiment of a mobile device used in FIG. 1.

FIG. 4 illustrates an example embodiment of device 114 used in FIG. 1. As provided by FIG. 4, device 114 may be mobile device 114 that includes display 200. Display 200 may include a touchscreen. In particular embodiments, display 200 may present items in first region 410 and second region 430. First region 410 may include unread events 420. Unread events 420 are associated with events 170 that may have occurred after user 112 ended the last authenticated session but prior to and/or up to the current authenticated session. A particular unread event 420 may provide information about the particular event 170 with which the particular unread event 420 is associated. Example information may include the source of the particular transaction or communication, an amount of money (if any) associated with the particular transaction or communication, and/or a timestamp of the particular transaction or communication associated with the particular event 170. Display 200 may also include second region 430 which may present read events 430. Read events 430 are associated with events 170 that may have occurred prior to user 112 ending the last authenticated session. Read events 430 may provide the same type of information provided by unread events 420.

Display 200 may also include a mechanism to allow user 112 to view multiple unread events 420 that may not all be displayed at the same time in first region 410. For example, display 200 may include scroll bar 450. When user 112 interacts with scroll bar 450, display 200 may scroll first region 410 to present additional unread events 420. In certain embodiments, when display 200 has displayed all unread events 420 in first region 410, first region 410 and second region 430 may be merged together visually such that scroll bar 450 may scroll first region 410 in conjunction with second region 430 as if both regions were a single list.

Returning to FIG. 1, in operation, system 100 may provide a faster and more convenient way for user 112 to manage and interact with information associated with accounts 140, transactions 150, financial services 160, and/or events 170. For example, device 114 may provide an interface to user 112 to allow user 112 to manage user preferences 165 for receiving and interacting with certain information. User 112 may choose particular accounts 140, transactions 150, financial services 160, and/or events 170 for which to receive certain information. The user preferences 165 of user 112 may prioritize receiving information from one source over another source. User 112 may choose to receive notifications for certain accounts 140, transactions 150, financial services 160, and/or events 170 while choosing not to receive notification for other accounts 140, transactions 150, financial services 160, and/or events 170. Once user 112 has updated user preferences 165, device 114 may store user preferences 165 in memory 134 and/or may communicate user preferences 165 to server 110 via message 180 for storage in memory 134.

Device 114 may also provide up to date information to user 112 regarding a variety of financial services 160. This operation will be described with reference to FIG. 2. Device 114 may retrieve user preferences 165 which notify device 114 of what particular information to display to user 112. In certain embodiments, user preferences 165 may notify device 114 to present information associated with particular financial services 160. For example, after determining which financial services 160 to display from user preferences 165, device 114 may communicate message 180 to server 110 requesting information associated with particular financial services 160. In response, server 110 may communicate the requested information to device 114. Device 114 may then present information associated with a first financial service 160 in first region 210, information associated with a second financial service 160 in second region 220, information associated with a third financial service 160 in third region 230, and information associated with a fourth financial service 160 in fourth region 240.

Any one of the regions of display 200 is operable to present updates to the information associated with a particular financial service 160. For example, server 110 may determine information associated with a particular financial service 160 is out of date due to an occurrence of an event such as a new bill, transaction, event, and/or any other occurrence suitable for a financial institution. Server 110 may communicate updated information via message 180 to device 114. Device 114 may receive the updated information and may indicate the update to user 112 using a visual and/or audio cue. For example, device 114 may present a graphical counter in a particular region and an update to the financial service 160 may comprise incrementing the graphical counter.

After information has been presented to user 112 in the various regions, user 112 may select one of the financial services 160 for presentation of additional information. In certain embodiments, user 112 may touch a particular region indicating the selection of the particular financial service 160. In response to the selection by user 112, device 114 may communicate message 180 to server 110 requesting further information associated with the particular financial service 160. Server 110 may retrieve information associated with the particular financial service 160 from memory 134 which may include accessing information stored as accounts 140, transactions 150, and/or events 170. Once the appropriate information is retrieved, device 114 may display the information regarding financial service 160 on display 200. For example, display 200 may replace information being displayed in first region 210, second region 220, third region 230, and fourth region 240 with information associated with the selected financial service 160. In certain embodiments, the selection of the particular financial service 160 may reset to zero any graphical counters for unread messages that may have been associated with the financial service 160.

Device 114 may also provide the functionality for user 112 to review and manage information associated with accounts 140, transactions 150, financial services 160, and/or events 170. For example, device 114 may retrieve information associated with transactions 150 and/or events 170 from memory 134. Device 114 may then present the information to user 112 in first region 310 of display 200. In certain embodiments, device 114 may display the first of many events 170 or transactions 150 based on a time associated with the item, whether the item has not been reviewed, whether the item has been marked for further review, or any other rule suitable for a particular purpose.

Device 114 may also present second region 320 that provides user 112 with the option to mark a particular transaction 150 or event 170 for further review. In certain embodiments, second region 320 may be pre-selected indicating that user 112 should review the particular transaction 150 or event 170. Device 114 may also present third region 330, which when selected, may indicate that user 112 has reviewed the particular transaction 150 or event 170. Device 114 may determine that in addition to the information for a particular transaction 150 or event 170 that is being currently displayed, there are additional transactions 150 or events 170 that may be displayed. For example, device 114 may have a plurality of transactions 150 or events 170 to display. Device 114 may display a first one of the plurality of transactions 150 or events 170 in first region 310. Device 114 may display an indication of the rest of the plurality of transactions 150 or events 170, if any, in fourth regions 360.

For any item presented in first region 310, user 112 may indicate the current item should be marked for further review. User 112 may do this by interacting with second region 320 indicating that the particular transaction 150 or event 170 is marked for further review. In certain embodiments, in response to marking the particular transaction 150 or event 170 for further review, message 180 may be communicated to server 110 indicating that user 112 has marked the particular transaction 150 or event 170 for further review. Server 110 may determine that this indicates that user 112 is challenging the accuracy of transaction 150 or event 170 and may initiate appropriate rules for handling customer disputes.

User 112 may also indicate that the current item in first region 310 has been reviewed. For example, user 112 may interact with third region 330 indicating the current item has been reviewed. Additionally, user 112 may swipe from the first region 312 to the fifth region 340 indicating that the next item should be displayed. In response to user 112 indicating that the next item, if any, should be displayed, device 114 may update first region 310, second region 320, and third region 330 accordingly. For example, device 114 may display a transaction 150 or event 170 that occurred subsequent to the previously displayed transaction 150 or event 170 in first region 310. Fourth regions 360 may also be updated to display an appropriate number of transactions 150 or events 170.

The operation of presenting user 112 with information about transactions 150 and events 170 that occurred subsequent to the last session of user 112 will now be described. Device 114 may authenticate user 112 an initial time. Device 114 may determine when user 112 logs out from a particular application or otherwise ceases to user a particular application that may provide the present operation ending the session of user 112. Device 114 may then detect a second authentication of user 112. In response to detecting an authentication of user 112, device 114 may then retrieve information about transactions 150 and/or events 170 that may have occurred subsequent to the last session of user 112. After determining which transactions 150 and/or events 170 may have occurred since the last session of user 112, device 114 may display the information associated with particular transactions 150 or events 170 that occurred since the last session of user 112 in first region 410 of display 200 as unread events 420.

Device 114 may also determine if any transactions 150 and/or events 170 occurred prior to the last session of user 112. Device 114 may display information associated with particular transactions 150 and/or events 170 as read events 440 in second region 430 of display 200.

In certain instances, unread events 420 may not all be displayed at the same time in first region 410 due to space constraints of first region 410. In such an instance, device 114 may present scroll bar 450 in display 200. Device 114 may detect a touch from user 112 on or near scroll bar 450 indicating the desire of user 112 to view more unread events 420. In response to the interaction of user 112 with scroll bar 450, device 114 may display more unread events 420 by scrolling first region 430 upward. When all unread events 420 have been displayed, first region 410 and second region 420 may be merged together visually such that scroll bar 450 may scroll first region 410 in conjunction with second region 430 as if both regions were a single list.

In particular embodiments, system 100 provides user 112 with an intuitive and fast interface through which to manage and review electronic notices and transactions. In this manner, system 100 may encourage and incentivize users 112 to overcome any fears or concerns with respect to using device 114 to manage and review electronic notices and transactions. Furthermore, in particular embodiments, device 114 may be a mobile device 114, which may require less processing power to present an interface to user 112 than a workstation or a personal computer. Additionally, mobile device 114 may execute application 190 to initiate the functions described above, which may generate less network traffic than a workstation or a personal computer performing the same operations, thus improving network efficiency by reducing load.

Figure 5:
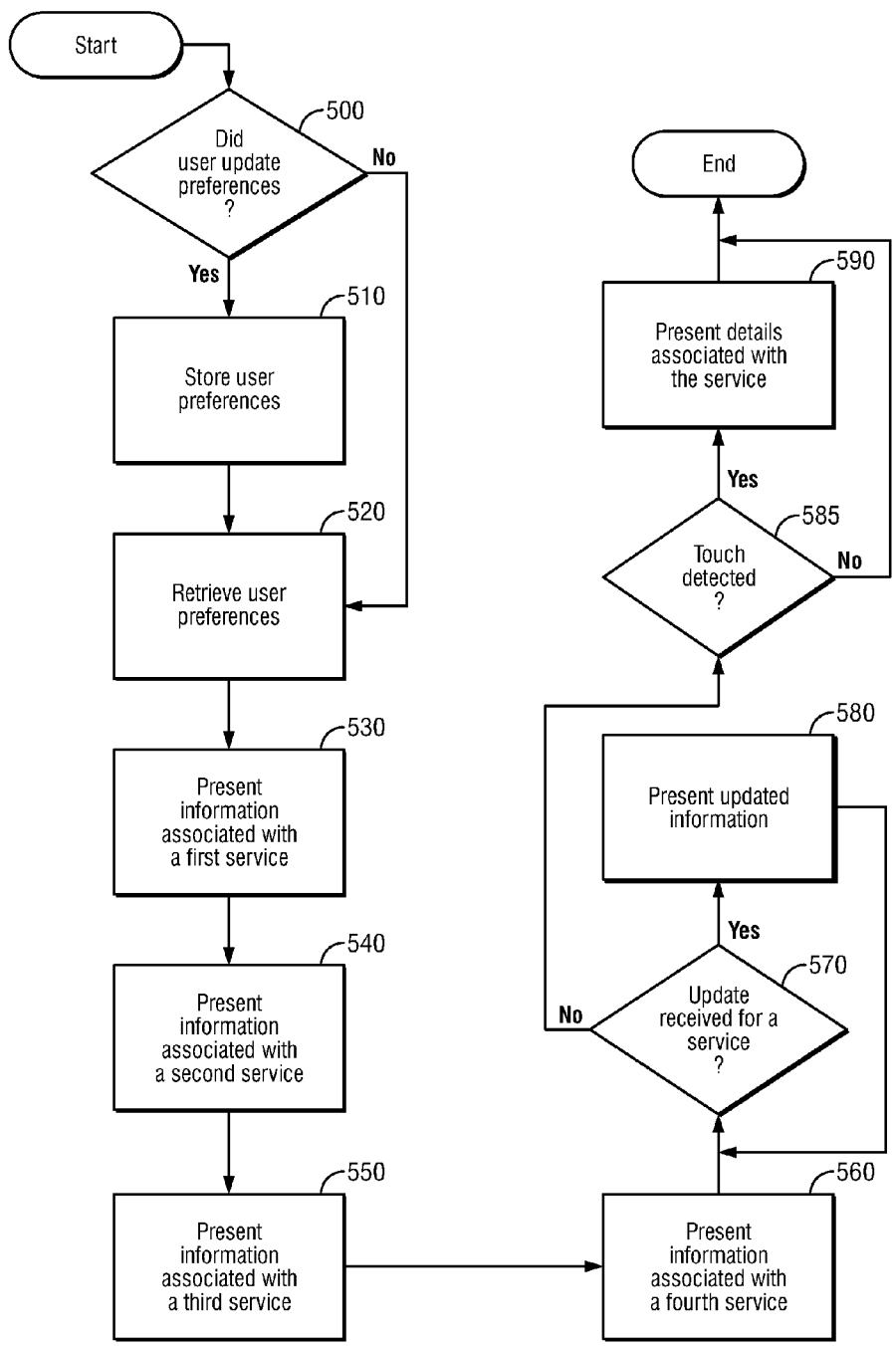
FIG. 5 is a flowchart illustrating a method for managing electronic notices.

FIG. 5 is a flowchart illustrating a method for managing electronic notices. Mobile device 114 may perform the example method of FIG. 5. In particular embodiments, mobile device 114 may execute application 190 that causes mobile device 114 to perform the example method of FIG. 5. At step 500, device 114 may provide an interface to user 112 to allow user 112 to manage user preferences 165 for receiving and interacting with certain information. User 112 may choose particular accounts 140, transactions 150, financial services 160, and/or events 170 for which to receive certain information. The user preferences 165 of user 112 may prioritize receiving information from one source over another source. User 112 may choose to receive notifications for certain accounts 140, transactions 150, financial services 160, and/or events 170 while choosing not to receive notification for other accounts 140, transactions 150, financial services 160, and/or events 170. Mobile device 114 may determine whether user 112 has updated user preference 165. If user 112 has updated user preferences 165, the example method may proceed to step 510. Otherwise, the example method may proceed to step 520. At step 510, once user 112 has updated user preferences 165, device 114 may store user preferences 165 in memory 134 and/or may communicate user preferences 165 to server 110 via message 180 for storage in memory 134. The example method may then proceed to step 530.

At step 520, mobile device 114 may retrieve user preferences 165 which notify device 114 of what particular information to display to user 112. In certain embodiments, user preferences 165 may notify mobile device 114 to present information associated with particular financial services 160. For example, after determining which financial services 160 to display from user preferences 165, mobile device 114 may communicate message 180 to server 110 requesting information associated with particular financial services 160. In response, server 110 may communicate the requested information to mobile device 114. At step 530, mobile device 114 may then present information associated with a first financial service 160 in first region 210. At step 540, mobile device 114 may present information associated with a second financial service 160 in second region 220. At step 550, mobile device 114 may present information associated with a third financial service 160 in third region 230. At step 560, mobile device 114 may present information associated with a fourth financial service 160 in fourth region 240.

Any one of the regions of display 200 is operable to present updates to the information associated with a particular financial service 160. For example, at step 570 server 110 may determine information associated with a particular financial service 160 is out of date due to an occurrence of an event such as a new transaction 150, event 170, and/or any other occurrence suitable for a financial institution. If an update is found, server 110 may communicate updated information via message 180 to device 114 and the example method may proceed to step 580. Otherwise, the example method may proceed to step 585.

At step 580, mobile device 114 may receive the updated information and may indicate the update to user 112 using a visual and/or audio cue. For example, device 114 may present a graphical counter in a particular region and an update to the financial service 160 may comprise incrementing the graphical counter. The example method may then return to step 570 to check for more updates.

After information has been presented to user 112 in the various regions, at step 585, user 112 may select one of the financial services 160 for presentation of additional information. In certain embodiments, user 112 may touch a particular region indicating the selection of the particular financial service 160. If no touch is detected, then the example method may end. If a touch is detected, the example method may proceed to step 590. At step 590, in response to the selection by user 112, device 114 may communicate message 180 to server 110 requesting further information associated with the particular financial service 160. Server 110 may retrieve information associated with the particular financial service 160 from memory 134 which may include accessing information stored as accounts 140, transactions 150, and/or events 170. Once the appropriate information is retrieved, device 114 may display the information regarding financial service 160 on display 200. For example, display may replace information being displayed in first region 210, second region 220, third region 230, and fourth region 240 with information associated with the selected financial service 160. In certain embodiments, the selection of the particular financial service 160 may reset to zero any graphical counters for unread messages that may have been associated with the financial service 160.

By performing the example method above, mobile device 114 may provide several technical advantages. For example, mobile device 114 may reduce the load on network 120. Furthermore, by executing application 190, mobile device 114 may reduce the amount of processing power needed to perform various functions related to the management and retrieval of electronic notices.

Figure 6:
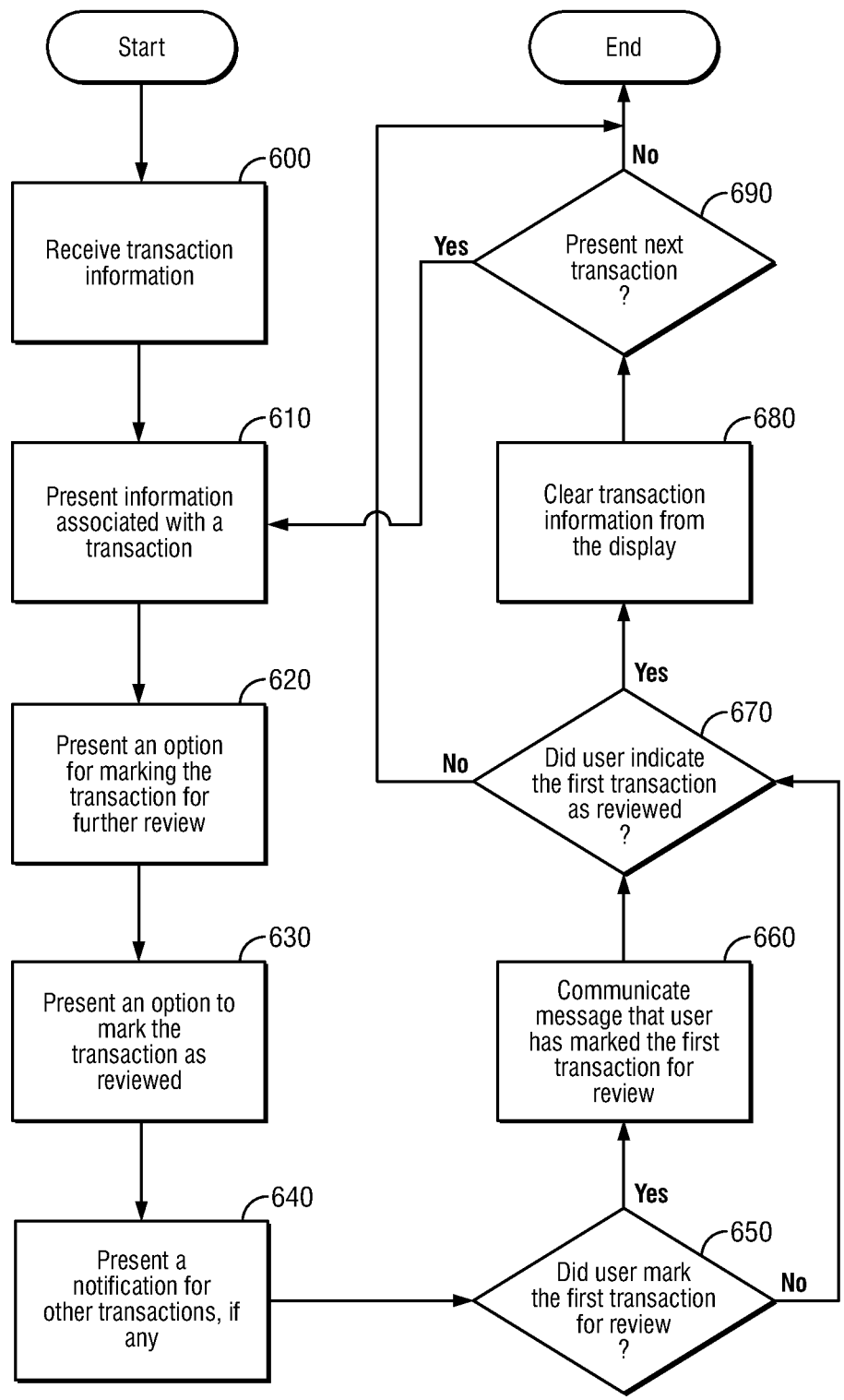
FIG. 6 is a flowchart illustrating a method for managing electronic transactions.

FIG. 6 is a flowchart illustrating a method for managing electronic transactions. Mobile device 114 may perform the example method of FIG. 6. In particular embodiments, mobile device 114 may execute application 190 that causes mobile device 114 to perform the example method of FIG. 6. The example method of FIG. 6 begins at step 600 where mobile device 114 may retrieve information associated with transactions 150 and/or events 170 from memory 134. At step 610, mobile device 114 may then present the information to user 112 in first region 310 of display 200. In certain embodiments, device 114 may display the first of many events 170 or transactions 150 based on a time associated with the item, whether the item has not been reviewed, whether the item has been marked for further review, or any other rule suitable for a particular purpose.

At step 620, mobile device 114 may present second region 320 that provides user 112 with the option to mark a particular transaction 150 or event 170 for further review. In certain embodiments, second region 320 may be pre-selected indicating that user 112 should review the particular transaction 150 or event 170. At step 630, mobile device 114 may present third region 330, which when selected, may indicate that user 112 has reviewed the particular transaction 150 or event 170.

At step 640, mobile device 114 may determine that in addition to the information for a particular transaction 150 or event 170 that is being currently displayed, there are additional transactions 150 or events 170 that may be displayed. Device 114 may display these one or more additional transactions 150 or events 170, if any, in fourth regions 360.

For any item presented in first region 310, user 112 may indicate the current item should be marked for further review. At step 650, mobile device may detect whether user 112 marked the current transaction 150 or event 170 for further review. For example, user 112 may do this by interacting with second region 320 indicating that the particular transaction 150 or event 170 is marked for further review and the example method may proceed to step 660. Otherwise, the example method may proceed to step 670. At step 660, in response to marking the particular transaction 150 or event 170 for further review message 180 may be communicated to server 110 indicating that user 112 has marked the particular transaction 150 or event 170 for further review. Server 110 may determine that this indicates that user 112 is challenging the accuracy of transaction 150 or event 170 and may initiate appropriate rules for handling customer disputes. The example method may proceed to step 670.

At step 670, mobile device 114 may determine whether the current transaction 150 or event 170 has been reviewed. For example, user 112 may indicate that the current item in first region 310 has been reviewed by interacting with third region 330 indicating the current item has been reviewed. Additionally, user 112 may swipe from the first region 312 to the fifth region 340 indicating that the next items should be displayed. If user 112 has reviewed the current item, the example method may proceed to step 680. Otherwise, the example method may end.

At step 680, in response to user 112 indicating that the next item, if any, should be displayed, mobile device 114 may update first region 310, second region 320, and third region 330 accordingly. For example, mobile device 114 may clear information regarding the current item from first region 310, second region 320, and third region 330 and proceed to step 690. At step 690, mobile device 114 may determine whether a transaction 150 or event 170 occurred subsequent to the previously displayed transaction 150 or event 170 in first region 310. If there are other items to be displayed, the example method may return to step 610. Otherwise, the example method may end.

By performing the example method above, mobile device 114 may provide several technical advantages. For example, mobile device 114 may reduce the load on network 120. Furthermore, by executing application 190, mobile device 114 may reduce the amount of processing power needed to perform various functions related to the management and retrieval of electronic notices.

Figure 7:
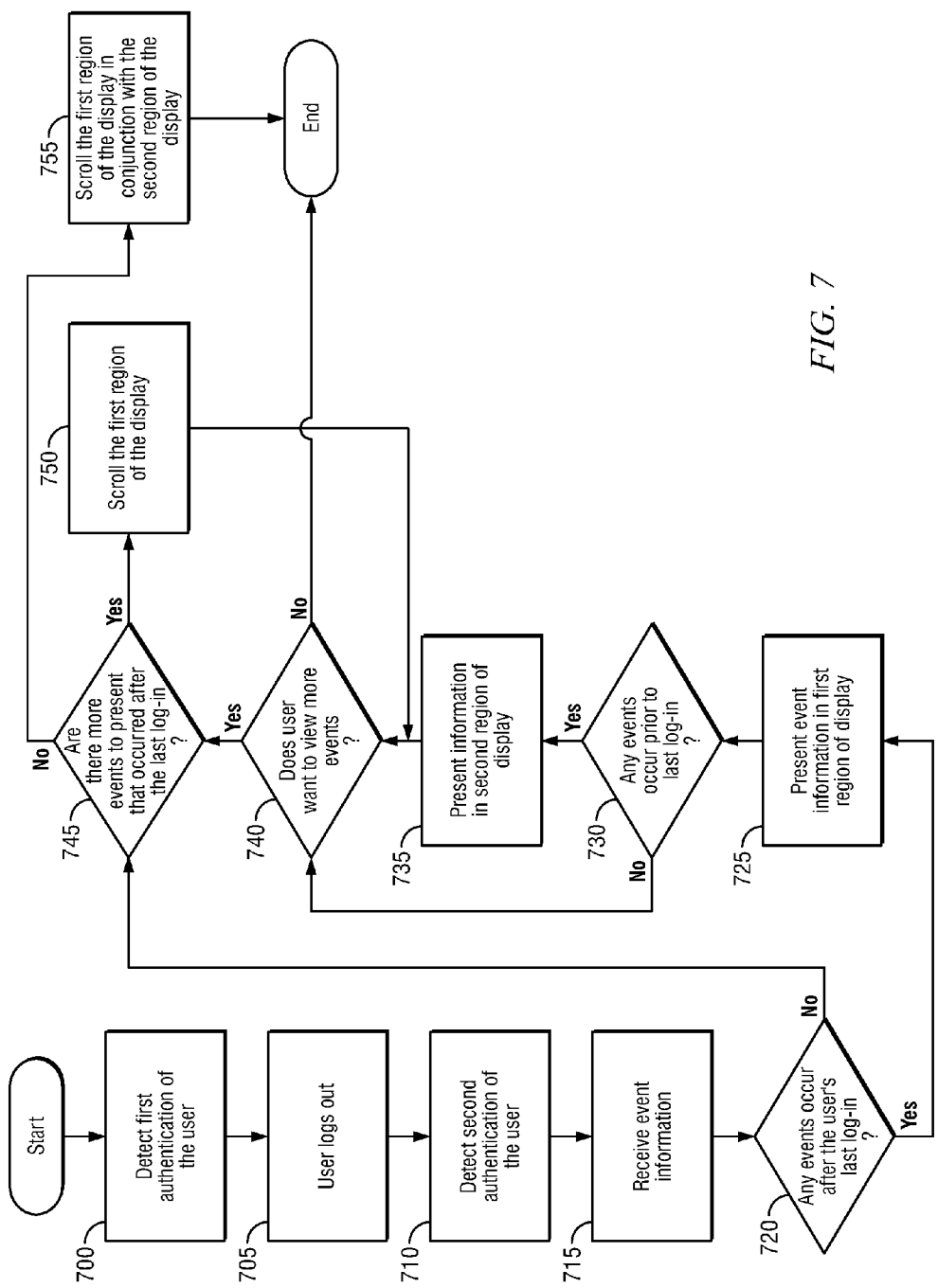
FIG. 7 is a flowchart illustrating a method for presenting electronic notices.

FIG. 7 is a flowchart illustrating a method for presenting electronic notices. Mobile device 114 may perform the example method of FIG. 7. In particular embodiments, mobile device 114 may execute application 190 that causes mobile device 114 to perform the example method of FIG. 7. At step 700, mobile device 114 may authenticate user 112 an initial time. At step 705, mobile device 114 may determine when user 112 logs out from a particular application or otherwise ceases to use a particular application that may provide the present operation ending the session of user 112. At step 710, mobile device 114 may then detect a second authentication of user 112. At step 715, in response to detecting an authentication of user 112, device 114 may then retrieve information about transactions 150 and/or events 170 that may have occurred subsequent to the last session of user 112. At step 720, mobile device 114 may determine whether any transactions 150 and/or events 170 have occurred subsequent to the last session of user 112. If mobile device 114 determines that no transactions 150 or events 170 occurred subsequent to the last session of user 112, then the example method may proceed to step 745. Otherwise, the example method may proceed to step 725. At step 725, after determining which transactions 150 and/or events 170 may have occurred since the last session of user 112, device 114 may display the information associated with particular transactions 150 or events 170 that occurred since the last session of user 112 in first region 410 of display 200 as unread events 420. The example method may proceed to step 730.

At step 730, mobile device 114 may determine if any transactions 150 and/or events 170 occurred prior to the last session of user 112. If mobile device 114 determines that no transactions or events occurred prior to the last session of user 112, the example method may proceed to step 740. Otherwise, the example method may continue to step 735 where mobile device 114 may display information associated with particular transactions 150 and/or events 170 as read events 440 in second region 430 of display 200. The example method may proceed to step 740.

In certain instances unread events 420 may not all be displayed at the same time in first region 410 due to space constraints of first region 410. In such an instance, device 114 may present scroll bar 450 in display 200. At step 740, mobile device 114 may detect a touch from user 112 on or near scroll bar 450 indicating the desire of user 112 to view more unread events 420. If no touch is detected, the example method may end, otherwise, the example method may proceed to step 745. At step 745, in response to the interaction of user 112 with scroll bar 450, mobile device 114 may determine whether there are more transactions 150 or events 170 that occurred after the last session of user 112. If there are no other items fitting such a description, the example method may proceed to step 755. Otherwise the example method may proceed to step 750 where mobile device 114 may display more unread events 420 by scrolling first region 430 upward. At step 755, when all unread events 420 have been displayed, first region 410 and second region 420 may be merged together visually such that scroll bar 450 may scroll first region 410 in conjunction with second region 430 as if both regions were a single list.

By performing the example method above, mobile device 114 may provide several technical advantages. For example, mobile device 114 may reduce the load on network 120. Furthermore, by executing application 190, mobile device 114 may reduce the amount of processing power needed to perform various functions related to the management and retrieval of electronic notices.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory operable to an application configured to provide an interface comprising a plurality of regions for displaying information associated with a plurality of executed transactions, wherein the plurality of executed transactions are associated with a savings or checking account of a user; and
a processor communicatively coupled to the memory, the processor operable to run the application to:
present, in a first region of a display, information associated with a first transaction of the plurality of executed transactions;
present, in a second region of the display, a first option, the first option indicating that, when selected, the user has marked the first transaction for further review;
present, in a third region of the display, a second option, the second option indicating that, when selected, the user has reviewed the first transaction;
present, in a fourth region of the display, a notification, the notification indicating a second transaction of the plurality of transactions, wherein the second transaction was executed subsequent to the first transaction;
detect a first touch on the display indicating the selection of the second transaction; and
update at least one region selected from the first region, the second region, the third region, and the fourth region in response to detecting the first touch, wherein updating the at least one region comprises replacing in the first region of the display, information associated with the first transaction with information associated with the second transaction, and
wherein the first transaction and the second transaction are each selected from the group consisting of a purchase, a credit, a debit, a balance transfer, a payment due, a rejected payment, a financial fee, and an executed financial transaction for a particular purpose.

2. The apparatus of claim 1, wherein the processor is further operable to:
detect a second touch on the second region of the display, the second touch indicating that the user has marked the second transaction for further review; and
present, in the second region of the display, in response to detecting the second touch, an indication that the second transaction is marked for further review.

3. The apparatus of claim 2, wherein the processor is further operable to communicate a message, in response to detecting the second touch, that the user has marked the second transaction for further review.

4. The apparatus of claim 2, wherein the processor is further operable to:
detect a first authentication of the user; and
present, in the first region of the display, information associated with the second transaction in response to detecting the first authentication of the user and the indication that the user has marked the second transaction for further review.

5. The apparatus of claim 1, wherein the processor is further operable to:
detect a second touch on the third region of the display, the second touch indicating that the user has reviewed the second transaction; and
present, in the third region of the display, in response to detecting the second touch, an indication that the user has reviewed the second transaction.

6. The apparatus of claim 5, wherein the processor is further operable to communicate a message, in response to detecting the second touch, that the user has marked the second transaction as being reviewed.

7. The apparatus of claim 5, wherein the processor is further operable to:
detect a first authentication of the user; and
present, in the first region of the display, information associated with a third transaction in response to detecting the first authentication of the user and the indication that the user has reviewed the second transaction.

8. A method comprising:
storing an application configured to provide an interface comprising a plurality of regions for displaying information associated with a plurality of executed transactions, wherein the plurality of executed transactions are associated with a savings or checking account of a user;
presenting, in a first region of a display, information associated with a first transaction of the plurality of executed transactions;
presenting, in a second region of the display, a first option, the first option indicating that, when selected, the user has marked the first transaction for further review;
presenting, in a third region of the display, a second option, the second option indicating that, when selected, the user has reviewed the first transaction;
presenting, in a fourth region of the display, a notification, the notification indicating a second transaction of the plurality of transactions, wherein the second transaction was executed subsequent to the first transaction;
detecting a first touch on the display indicating the selection of the second transaction; and
updating at least one region selected from the first region, the second region, the third region, and the fourth region in response to detecting the first touch, wherein updating the at least one region comprises replacing, in the first region of the display, information associated with the first transaction with information associated with the second transaction, and wherein the first transaction and the second transaction are each selected from the group consisting of a purchase, a credit, a debit, a balance transfer, a payment due, a rejected payment, a financial fee, and an executed financial transaction for a particular purpose.

9. The method of claim 8, further comprising:
detecting a second touch on the second region of the display, the second touch indicating that the user has marked the second transaction for further review; and
presenting, in the second region of the display, in response to detecting the second touch, an indication that the second transaction is marked for further review.

10. The method of claim 9, further comprising communicating a message, in response to detecting the second touch, that the user has marked the second transaction for further review.

11. The method of claim 9, further comprising:
detecting a first authentication of the user; and
presenting, in the first region of the display, information associated with the second transaction in response to detecting the first authentication of the user and the indication that the user has marked the second transaction for further review.

12. The method of claim 8, further comprising:
detecting a second touch on the third region of the display, the second touch indicating that the user has reviewed the second transaction; and
presenting, in the third region of the display, in response to detecting the second touch, an indication that the user has reviewed the second transaction.

13. The method of claim 12, further comprising communicating a message, in response to detecting the second touch, that the user has marked the second transaction as being reviewed.

14. The method of claim 12, further comprising:
detecting a first authentication of the user; and
presenting, in the first region of the display, information associated with a third transaction in response to detecting the first authentication of the user and the indication that the user has reviewed the second transaction.

15. One or more non-transitory computer-readable media comprising logic, the logic when executed by one or more processors operable to perform operations comprising:
storing an application configured to provide an interface comprising a plurality of regions for displaying information associated with a plurality of executed transactions, wherein the plurality of executed transactions are associated with a savings or checking account of a user;
presenting, in a first region of a display, information associated with a first transaction of the plurality of executed transactions;
presenting, in a second region of the display, a first option, the first option indicating that, when selected, the user has marked the first transaction for further review;
presenting, in a third region of the display, a second option, the second option indicating that, when selected, the user has reviewed the first transaction;
presenting, in a fourth region of the display, a notification, the notification indicating a second transaction of the plurality of transactions, wherein the second transaction was executed subsequent to the first transaction;
detecting a first touch on the display indicating the selection of the second transaction; and
updating at least one region selected from the first region, the second region, the third region, and the fourth region in response to detecting the first touch, wherein updating the at least one region comprises replacing, in the first region of the display, information associated with the first transaction with information associated with the second transaction, and
wherein the first transaction and the second transaction are each selected from the group consisting of a purchase, a credit, a debit, a balance transfer, a payment due, a rejected payment, a financial fee, and an executed financial transaction for a particular purpose.

16. The media of claim 15, wherein the logic is further operable to perform operations comprising:
detecting a second touch on the second region of the display, the second touch indicating that the user has marked the second transaction for further review; and
presenting, in the second region of the display, in response to detecting the second touch, an indication that the second transaction is marked for further review.

17. The media of claim 16, wherein the logic is further operable to perform operations comprising communicating a message, in response to detecting the second touch, that the user has marked the second transaction for further review.

18. The media of claim 16, wherein the logic is further operable to perform operations comprising:
detecting a first authentication of the user; and
presenting, in the first region of the display, information associated with the second transaction in response to detecting the first authentication of the user and the indication that the user has marked the second transaction for further review.

19. The media of claim 15, wherein the logic is further operable to perform operations comprising:
detecting a second touch on the third region of the display, the second touch indicating that the user has reviewed the second transaction; and
presenting, in the third region of the display, in response to detecting the second touch, an indication that the user has reviewed the second transaction.

20. The media of claim 19, wherein the logic is further operable to perform operations comprising communicating a message, in response to detecting the second touch, that the user has marked the second transaction as being reviewed.

21. The media of claim 19, wherein the logic is further operable to perform operations comprising:
detecting a first authentication of the user; and
presenting, in the first region of the display, information associated with a third transaction in response to detecting the first authentication of the user and the indication that the user has reviewed the second transaction.

* * * * *